United States Patent [19]

Fetescu

[11] Patent Number: 5,758,486
[45] Date of Patent: Jun. 2, 1998

[54] METHOD AND APPARATUS FOR KEEPING CLEAN AND/OR CLEANING A GAS TURBINE USING EXTERNALLY GENERATED SOUND

[75] Inventor: Mircea Fetescu, Ennetbaden, Switzerland

[73] Assignee: Asea Brown Boveri AG, Baden, Switzerland

[21] Appl. No.: 714,966

[22] Filed: Sep. 17, 1996

Related U.S. Application Data

[63] Continuation of Ser. No. 355,232, Dec. 9, 1994, abandoned.

[30] Foreign Application Priority Data

Dec. 9, 1993 [DE] Germany .............. 43 41 996.8

[51] Int. Cl.⁶ .............. F02C 7/00; F01D 21/10; F02B 77/04; B08B 3/12
[52] U.S. Cl. .............. 60/39.02; 60/39.07
[58] Field of Search .............. 60/39.02, 39.07, 60/39.33, 204, 725

[56] References Cited

U.S. PATENT DOCUMENTS

| | | | |
|---|---|---|---|
| 3,108,767 | 10/1963 | Eltis et al. | 60/39.07 |
| 3,936,606 | 2/1976 | Wanke | 179/1 P |
| 4,380,893 | 4/1983 | Stokes et al. | 60/39.07 |
| 4,529,422 | 7/1985 | Phillips | 55/277 |
| 5,025,887 | 6/1991 | Jamison | 181/187 |
| 5,349,811 | 9/1994 | Stickler et al. | 60/39.06 |
| 5,349,813 | 9/1994 | Eisinger | 60/35.511 |
| 5,419,877 | 5/1995 | Goforth et al. | 422/177 |

OTHER PUBLICATIONS

Ohanian, H.C., "Physics", published by W.W. Norton & Co., Inc., p. 409, 1985.

Primary Examiner—Timothy Thorpe
Assistant Examiner—Ted Kim
Attorney, Agent, or Firm—Oblon, Spivak, McClelland, Maier & Neustadt, P.C.

[57] ABSTRACT

In a method for keeping clean and/or cleaning, during operation, the inner surfaces affected by deposits of a gas turbine including a turbine part (2) and an upstream compressor part (3), the "fouling" is effectively prevented without disturbing the operating procedure by subjecting the inside of the gas turbine (1) to sound waves, at least at times, in particular from sound transmitters (8a, ..., 13b) arranged on the gas turbine (1).

29 Claims, 4 Drawing Sheets

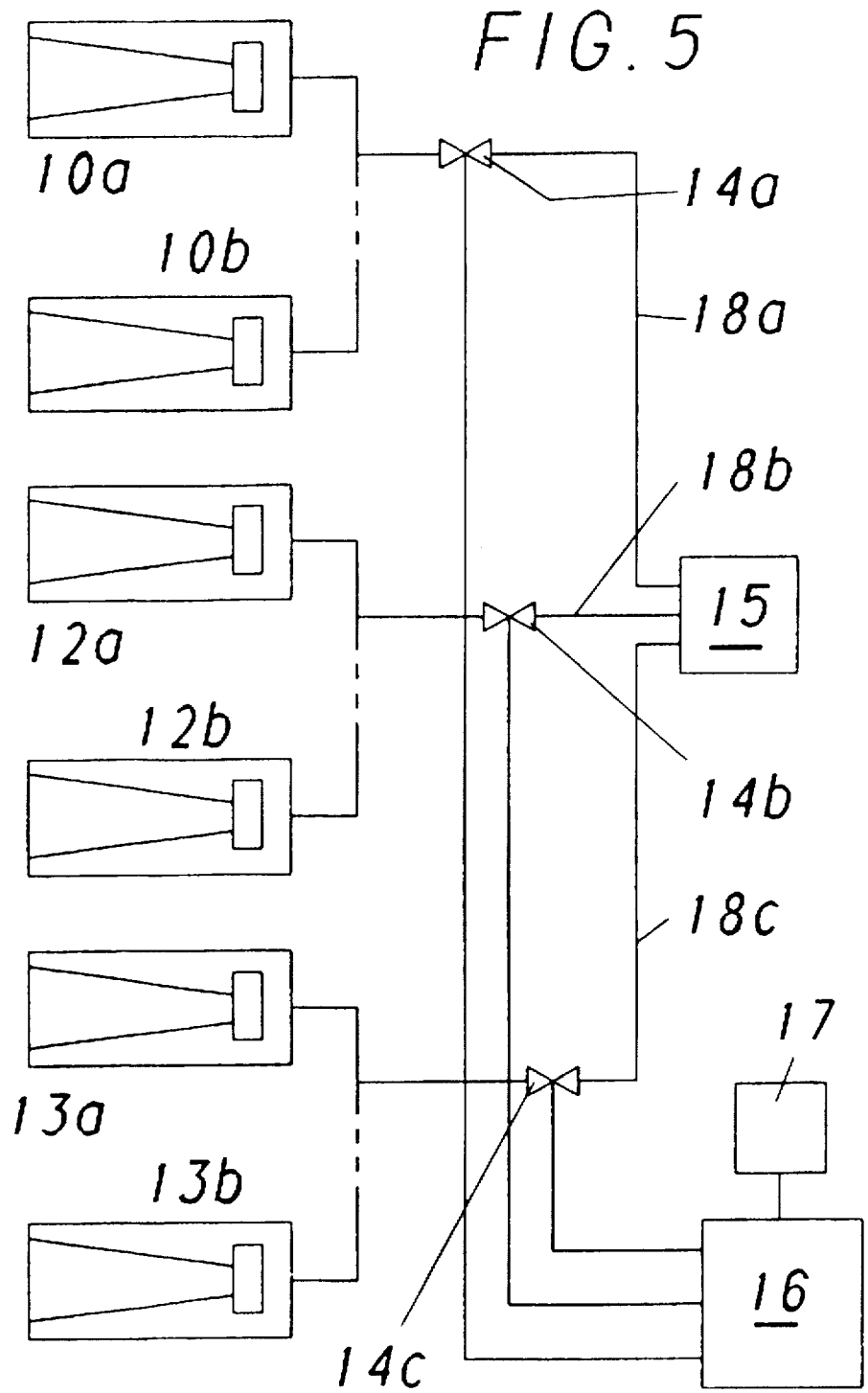

METHOD AND APPARATUS FOR KEEPING CLEAN AND/OR CLEANING A GAS TURBINE USING EXTERNALLY GENERATED SOUND

This application is a Continuation of application Ser. No. 08/355,232, filed on Dec. 9, 1994, now abandoned.

BACKGROUND OF THE INVENTION

1. Field of the Invention

The present invention relates to the field of gas turbines. It concerns a method for keeping clean and/or cleaning, during operation, the inner surfaces affected by deposits of a gas turbine including a turbine part and an upstream compressor part.

It also concerns an appliance for carrying out the method.

2. Discussion of Background

In gas turbines which are in operation, a deterioration of the mode of operation occurs with increasing duration of operation due to aging and, more particularly, due to deposits on the inner surfaces ("fouling"). This leads to a reduction in the output power and the efficiency. "Fouling" is generally understood to mean that deterioration which can be removed again during operation at full rotational speed ("on-line") or during operational pauses ("off-line").

The deposits on the blading in the turbine and compressor parts and in the flow duct of the air and combustion gases are caused by atmospheric dust and humidity and by fuel ash and other unburnt constituents of the fuel (on this point, see: T. Zaba, Losses in Gas Turbines Due to Deposits on the Blading, BBC Publication No. CH-KW 1583 87 E). It is particularly the "fouling" in the compressor part which leads to a marked deterioration of the output power and to an increase in the fuel consumption. This may, for example, be seen from the diagram in FIG. 3, which is taken from an article by R. Osswald, Air Inlet Systems, Gas Turbine Technology, Amsterdam, 6–8 Dec. 1989 and which shows, as a percentage, the increase in the fuel consumption (Heat Rate Increase HRI; Curve g) and the drop in power (Output Power Decrease OPD; Curve h) as a function of a falling pressure ratio in the compressor (Pressure Ratio Decrease PRD).

The prior art has previously included various possibilities for at least partially preventing deposits from the outset by preventive measures (primary measures) or of at least partially removing deposits which have already occurred by cleaning measures (secondary measures).

It is mainly the local climatic conditions and the local sources of air impurities and pollutants which have an influence on the "fouling" in the case of the compressor—depending, specifically, on the environment and the degree of air filtration. Additional and more effective filter systems can be fitted upstream as preventive measures in this case. On-line and off-line cleaning systems are known in the case of the secondary methods.

On-line cleaning of the compressor includes dry, abrasive cleaning by the introduction of solid particles (such as nut shells), steam cleaning, the injection of water and on-line compressor washing by the injection of a finely atomized cleaning fluid. All these on-line methods have a relatively small cleaning effect, require additional cleaning agents and cause additional maintenance costs.

Off-line cleaning of the compressor includes washing while the machine is cool and out of action while rotating the rotor by means of an outside drive ("crank wash") and cleaning with the machine open. These off-line methods are very effective in terms of cleaning but do, however, have disadvantages because, for example, of the necessary outage times, etc.

The effect of the conventional on-line and off-line cleaning of the compressor of a gas turbine can be read off from the typical curve of the electrical output power E as a function of the period of operation t in the case of intermediate cleaning, as reproduced in FIG. 1. The chain-dotted curve "a" shows the hypothetical, slow decrease in power due to aging, independent of the "fouling" of the compressor. Curve b shows the saw-tooth variation due to "fouling" and subsequent cleaning of the actual power output. The abrupt upward transition from a solid circle to a hollow circle corresponds in each case to a cleaning procedure. The maximum possible output power is regained at the point c by off-line cleaning whereas only a relative improvement occurs in the case of the other on-line cleaning operations. The shaded area between the curves a and b marks the power potential which could be achieved by combating the compressor "fouling" in an optimum manner.

Up to now, the turbine part could not be cleaned on-line. On the other hand, the turbine part can be washed at low rotational speed off-line in a similar manner to the compressor. Compared with the compressor, this leads to a greater improvement in the power.

Summarizing, it may be stated that the previous methods of combating "fouling" in gas turbines either produce only modest improvements despite the expenditure on cleaning agents and special installations (on-line cleaning of the compressor) or lead to large outage times and therefore increased overall costs (off-line cleaning).

SUMMARY OF THE INVENTION

Accordingly, one object of this invention is to provide a novel method by means of which the "fouling" in a gas turbine can be effectively prevented without disturbing the operational procedure and also to provide an appliance for carrying out the method.

The object is achieved in a method, of the type quoted at the beginning, wherein the inside of the gas turbine is subjected to sound waves, at least at times.

The heart of the invention consists in employing the destabilizing effect, known per se, of sound waves particularly those in the infrasonic range—on deposits in order to prevent the "fouling" in gas turbines. This effect has already been successfully applied for cleaning boilers, electrostatic separators or filter systems. By this means, it is not only possible to remove existing deposits of different types effectively without additional cleaning agents and without disturbing the operation, it is also possible—by regular use—to prevent the build-up of thick deposits from the outset.

The improvement achieved can be made clear by reference to the representation in FIG. 2. This shows, as a comparison in the case of a boiler, a first curve e of the efficiency W as a function of the operating duration t, this first curve e falling in each first period T1 due to increasing "fouling" and increasing again in a second period T2 due to conventional cleaning ("soot blowing")—therefore leading to an average efficiency in accordance with curve f—and a second curve d which, represents a constantly higher efficiency due to continuous infrasonic cleaning. Corresponding improvements (see the shaded part mentioned in FIG. 1) also occur when sonic cleaning is used in gas turbines.

A first preferred embodiment of the method according to the invention is one wherein sound waves are used with a frequency of less than 500 Hz, preferably in the infrasonic range of less than 50 Hz. The low frequencies achieve the effect that it is precisely the deposits in the gas turbine which are made to resonate, break up and disintegrate with great effectiveness so that they can be transported outwards without danger in the gas flow. It is then also advantageous for the frequency to be made variable so that it can satisfy different resonance conditions in the deposits simultaneously.

A second preferred embodiment of the method according to the invention is one wherein the sound waves are generated by local sound transmitters which are arranged at various positions in the gas turbine. This makes it possible to execute and, if necessary, to retrofit sonic cleaning without major modifications in the construction or operating procedure of the gas turbine.

A third preferred embodiment of the method according to the invention is one wherein acoustic horns operated by compressed air are used as the sound transmitters. Such horns are not only capable of emitting high sonic powers reliably and with little maintenance but can also, if necessary, be operated by compressed air from the compressor part itself.

A further preferred embodiment of the method according to the invention is one wherein the sound waves are emitted for a specified period of time at periodic intervals and the periodic intervals are between 5 and 60 minutes, in particular 10 to 15 minutes, and the specified periods of time are between 5 and 60 seconds, in particular 15 to 30 seconds. The build-up of thicker layers is prevented by the relatively short periodic sound radiation so that the degradation in the efficiency is reliably avoided from the outset.

The appliance for carrying out the method according to the invention is one wherein at least one sound transmitter is arranged on the gas turbine and emits sound waves within the gas turbine.

A preferred embodiment of the appliance according to the invention is one wherein the gas turbine includes a turbine part with an entry-end turbine inlet, an upstream compressor part with an entry-end air inlet and a combustion chamber arranged between the compressor part and the turbine part and wherein the at least one sound transmitter is arranged on the air inlet of the compressor part. Because it is precisely the first stages of the compressor which are particularly strongly affected by "fouling", this achieves high effectiveness with little complication.

Further embodiments are given in the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows, as an example, a circuit for operating the sound transmitters of FIG. 4.

DESCRIPTION OF THE PREFERRED EMBODIMENTS

Figure 1:
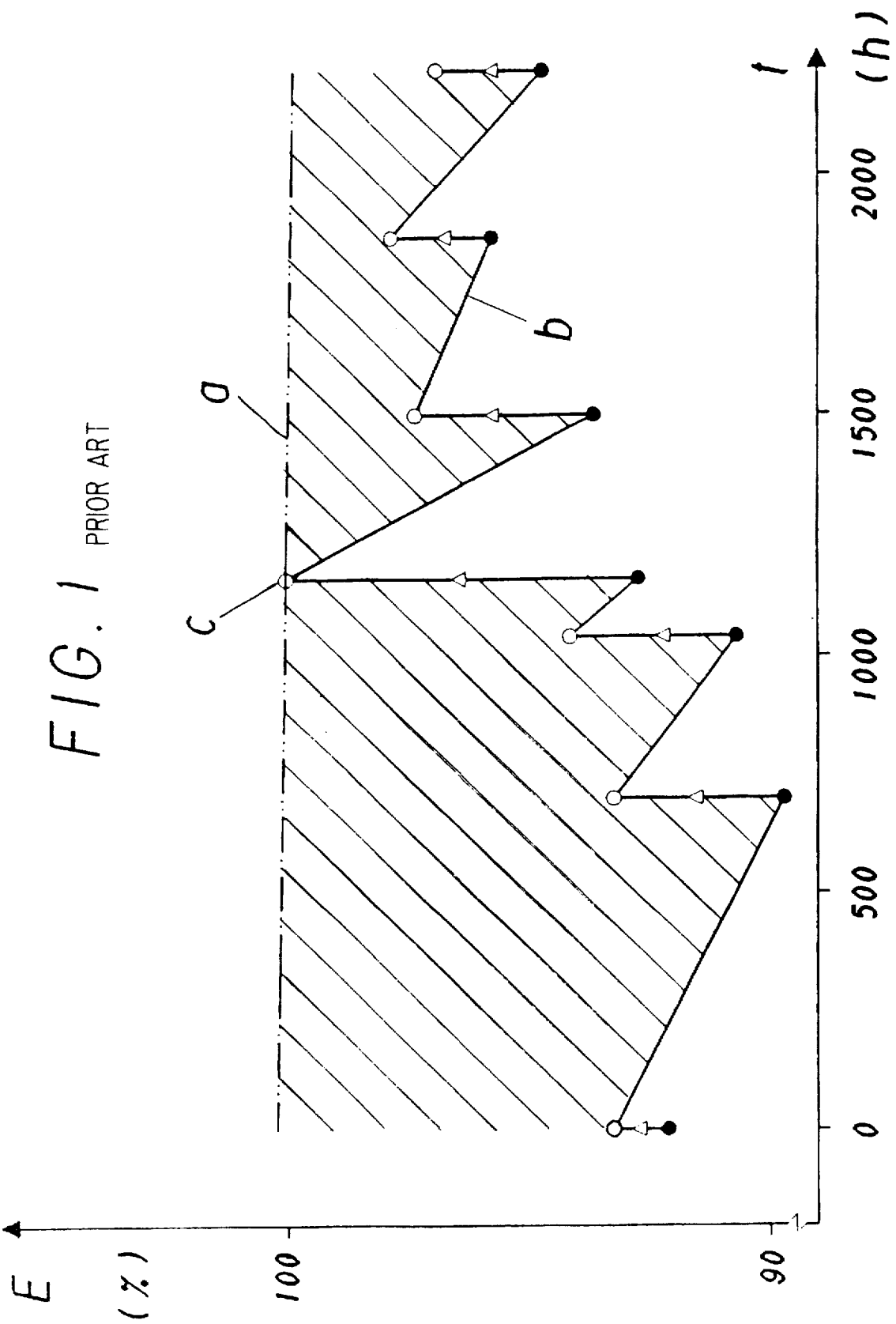
FIG. 1 shows, in a diagram, the variation of the electrical output power E of a gas turbine with operating duration t under the influence of "fouling" and the periodic on-line and off-line cleaning of the compressor using conventional methods (Curve b)
Figure 2:
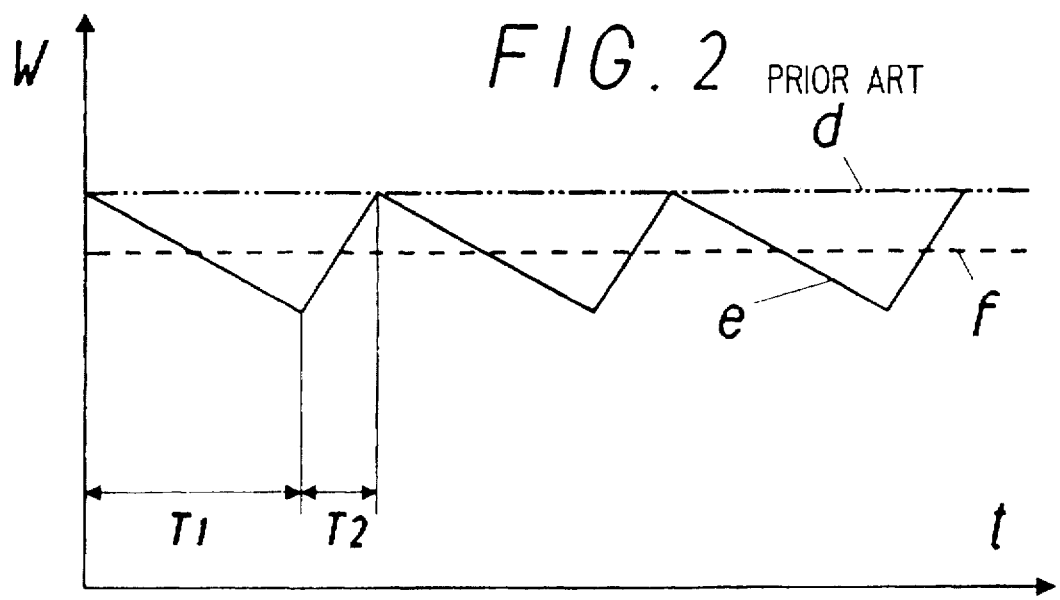
FIG. 2 shows, in a comparison diagram for a boiler, the efficiency W as a function of the operating duration t for operation with conventional cleaning (Curve e) and with infrasonic cleaning (Curve d)
Figure 3:
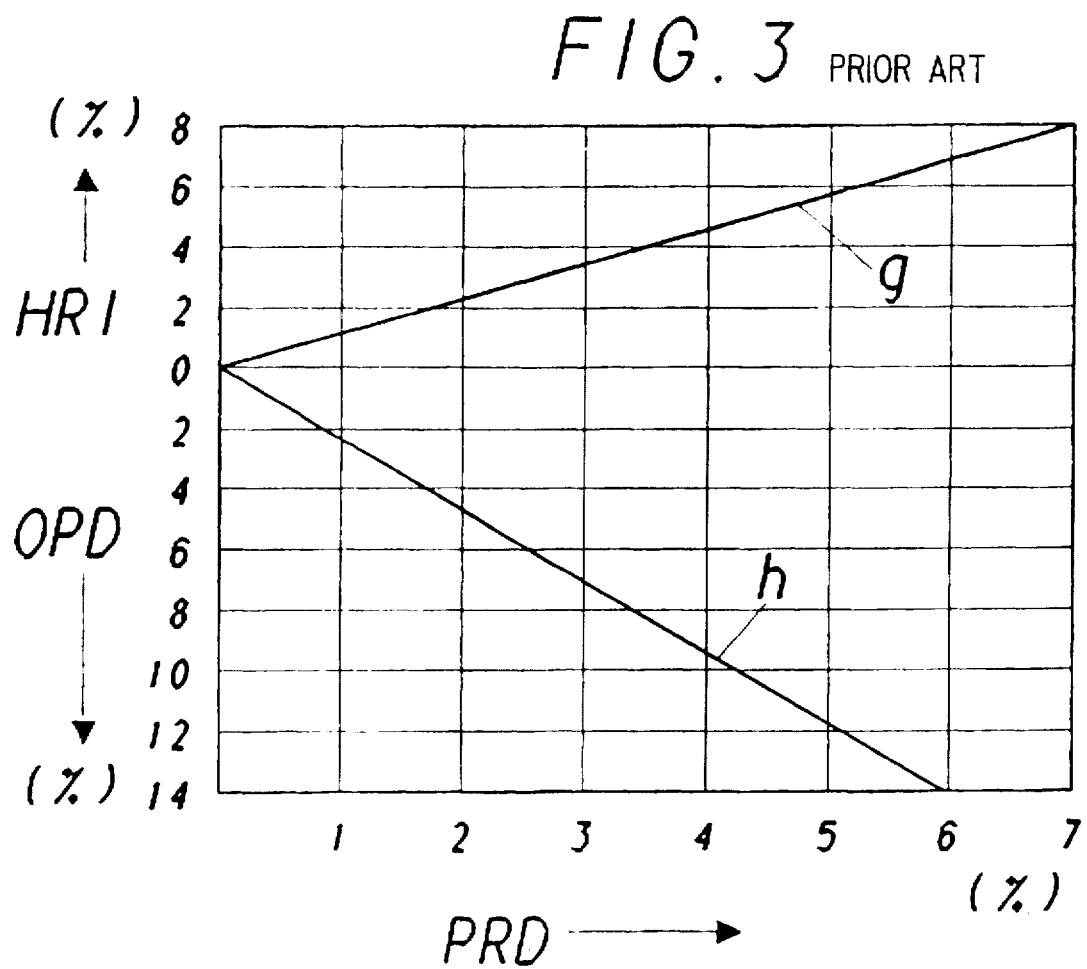
FIG. 3 shows, in a diagram, the increase in the fuel consumption (Heat Rate Increase HRI; Curve g) and the fall in the power (Output Power Increase OPD; Curve h) as a function of a falling pressure ratio in the compressor (Pressure Ratio Decrease PRD) due to increasing "fouling"
Figure 4:
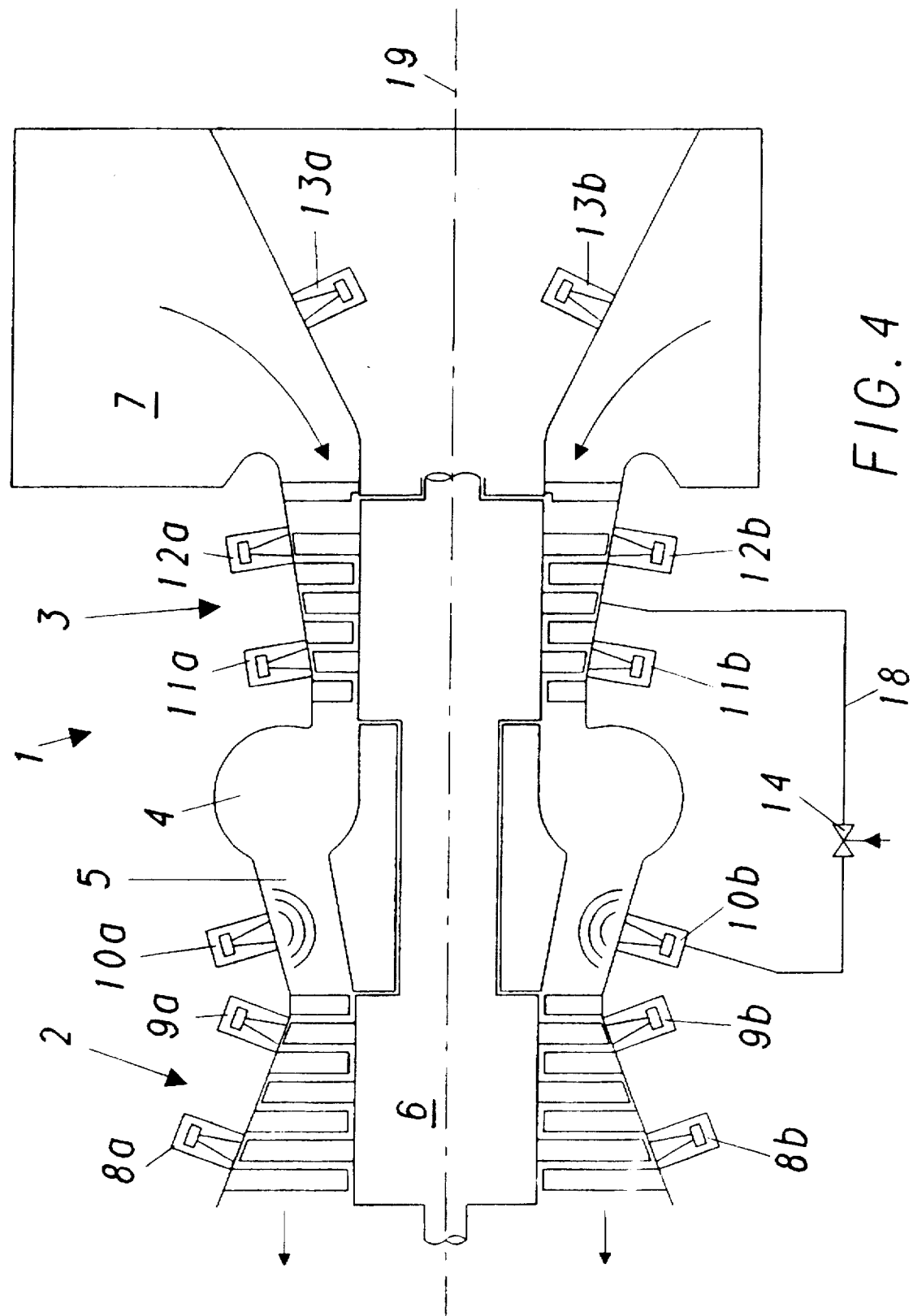
FIG. 4 shows, in a diagrammatic representation, an embodiment example of the employment of sound transmitters in a gas turbine in accordance with the invention.

Referring now to the drawings, wherein like reference numerals designate identical or corresponding parts throughout the several views, the construction of a gas turbine, which is equipped with an example of an appliance for keeping the gas turbine clean in accordance with the invention, is represented diagrammatically in FIG. 4. The gas turbine 1 includes a turbine part 2 with corresponding rotor blades and guide vanes, a compressor part 3 with corresponding rotor blades and guide vanes and a combustion chamber 4 (annular in the example) which is supplied with combustion air by the compressor part 3 and is in connection with the inlet end of the turbine part 2 via a turbine inlet 5. For its part, the compressor part 3 receives the combustion air to be compressed via an air inlet 7 and a filter (not shown in the figure) is usually connected upstream of the air inlet. The rotor blades of the turbine part 2 and the compressor part 3 are seated, in the example, on a common turbine shaft 6 which rotates about a turbine center line 19.

The rotor blades, the guide vanes and also the other internal surfaces of the gas turbine are subjected to deposits which precipitate from the medium flowing through the turbine. In the embodiment example represented in FIG. 4, a multiplicity of sound transmitters (8a, . . . , 13b) are therefore attached to the gas turbine 1 and these transmitters emit low-frequency sound of high intensity within the gas turbine. The sound waves break up existing deposits and effectively prevent the occurrence of new deposits. As already mentioned at the beginning, it is the first stages of the compressor part 3 which are mainly affected because a major part of the deposits are due to impurities and admixtures in the induced combustion air. Sound transmitters 13a, b are therefore preferentially arranged at the air inlet 7 of the compressor part 3 and their sound waves act on the inlet end and therefore on the first stages of the compressor part 3. The number and placement of the sound transmitters 13a, b are fundamentally based on the geometry of the air inlet 7 and the radiation intensity of the individual sound transmitter. In many cases, therefore, the use of only one sound transmitter is sufficient. In most cases, however, it will be expedient to arrange a plurality of sound transmitters 13a, b evenly distributed about the turbine center line 19 in order, correspondingly, to subject the inlet stage of the compressor part 3 to sound waves uniformly. The question of whether the arrangement of the sound transmitters 13a, b is undertaken—as is shown in FIG. 4—on the inner wall of the air inlet 7 and/or on the outer wall depends on the respective individual case.

In the example represented, the use of sound transmitters is not however limited to the air inlet 7 of the compressor part 3. The inlet stage of the turbine part 2, which is directly subjected to the hot combustion gases from the combustion chamber 4, is also subject to an increased danger of deposits. It is therefore expedient to install sound transmitters 10a, b there as well, in particular at the turbine inlet 5. In addition, further sound transmitters 11a, b and 12a, b as well as 8a, b and 9a, b can be advantageously arranged in the individual stages of the compressor part 3 and the turbine part 2. These further sound transmitters also keep the rear stages of the compressor part and the turbine part free from deposits or free them from deposits. Here again, the arrangement of the transmitters in the individual case depends strongly on the respective geometry and the flow and thermodynamic conditions within the machine.

The sound transmitters 8a, . . . , 12b are preferably operated in a frequency range less than 500 Hz, in particular in the infrasonic range less than 50 Hz, i.e. at approximately 20 Hz for example. These sound frequencies have already been found to be very effective for the cleaning of other appliances. The sound transmitters 8a, . . . , 12b do not then operate continuously but are activated in such a way that they emit sound waves of the desired intensity for a specified period of time at periodic intervals. Periodic intervals between 5 and 60 minutes and specified periods of time of 5 to 20 seconds have been found to be particularly effective for ensuring a constant high gas turbine efficiency. The frequency, sonic pressure and time parameters are then mainly based on the type of deposits in the particular application.

Preference is given to acoustic horns operated by compressed air as the sound transmitters. These operate on the principle of a vibrating diaphragm and are offered, for example, by the Swedish company Kockumation AB, Malmo, under the trade mark "SONOFORCE" and with the type designation IKT 230/220, IKT 150/250 or IKT 150/360. These horns emit sound with a frequency of 220, 250 or 360 Hz for example, require a positive pressure of 0.4 to 0.5 MPa and generate a sound pressure of an order of value above 140 dB at a distance of 1 m. Any suitable source can be employed as the compressed air source for operating the horns. It is, in any event, also conceivable to tap compressed air directly from the compressor part 3—as is represented in FIG. 4 using the sound transmitter 10b as an example—and to guide it to the sound transmitter via a compressed air conduit 18 with a controllable valve 14.

The supply and control diagram for a plurality of sound transmitters 10a, b, 12a, b and 13a, b mounted on the gas turbine is given in principle in FIG. 5. Provided they can all be operated with the same positive pressure because of the location at which they are used, the sound transmitters are supplied from a common compressed air source 15 via corresponding compressed air conduits 18a–c. Electrically controllable valves 14a–c are arranged in the compressed air conduits 18a–c and the compressed air supply to the transmitters can be controlled by means of these valves. The control of the valves 14a–c takes place by means of a valve control system 16 which is in turn activated at the desired time intervals for the desired periods of time by a timer 17. It is obvious that the individual sound transmitters 10a, b, 12a, b and 13a, b do not necessarily have to be activated at the same time.

Overall, the invention provides a new and effective method for removing or preventing deposits of the most varied type. This method can be combined, without hesitation, with conventional cleaning methods and is distinguished by the following advantages:

The method can be used on-line in order to keep the gas turbine surfaces free from deposits continuously and, more particularly, preventively and the method therefore makes it possible to operate the gas turbine with a high efficiency without degradation.

The installation and continuing operating and maintenance costs are very low.

There is no damage to the gas turbine or impairment to the environment.

The installation (also as retrofit) is very simple.

The operation can be easily automated.

The operating results of existing or new gas turbines can be substantially improved by means of the method.

Obviously, numerous modifications and variations of the present invention are possible in light of the above teachings. It is therefore to be understood that within the scope of the appended claims, the invention may be practiced otherwise than as specifically described herein.

| LIST OF DESIGNATIONS | |
|---|---|
| 1 | Gas turbine |
| 2 | Turbine part |
| 3 | Compressor part |
| 4 | Combustion chamber |
| 5 | Turbine inlet |
| 6 | Turbine shaft |
| 7 | Air inlet |
| 8a, b | Sound transmitter |
| 9a, b | Sound transmitter |
| 10a, b | Sound transmitter |
| 11a, b | Sound transmitter |
| 12a, b | Sound transmitter |
| 13a, b | Sound transmitter |
| 14, 14a–c | Valve |
| 15 | Compressed air source |
| 16 | Valve control |
| 17 | Timer |
| 18, 18a–c | Compressed air conduit |
| 19 | Turbine center line |
| a, b, d–h | Curve |
| c | Curve point |
| E | Electrical power |
| HRI | Heat Rate Increase |
| OPD | Output Power Decrease |
| PRD | Pressure Ratio Decrease |
| T1, T2 | Period of time |
| W | Efficiency |

What is claimed as new and desired to be secured by Letters Patent of the United States is:

1. A method for cleaning inner surfaces, affected by deposits, of a gas turbine having a turbine part and an upstream compressor part during operation of the gas turbine comprising:

positioning adjacent said turbine at least one sound wave generator, which is separate from said turbine and controlled to generate sound independently of sound generated by said turbine; and controlling said at least one sound generator at predetermined times during operation of said gas turbine to generate sound waves to be applied to an inside of the gas turbine; and transmitting sound waves generated in response to said controlling step to said inside of the gas turbine to clean inner surfaces of said gas turbine of said deposits.

2. The method an claimed in claim 1, wherein sound waves are generated with a fixed or variable frequency of less than 500 Hz.

3. The method an claimed in claim 1, wherein sound waves are generated with a fixed or variable frequency in a frequency range of less than 50 Hz.

4. The method as claimed in claim 3, wherein said at least one separate and independently controlled sound generator comprises plural local sound transmitters, comprising:

arranging said plural local sound transmitters at various positions at and attached to said gas turbine.

5. The method as claimed in claim 4, comprising:
    using acoustic horns operated by compressed air as said sound transmitters.

6. The method as claimed in claim 5, wherein said periodic intervals are between 5 and 60 minutes, and said specified lengths of time are between 5 and 60 seconds.

7. The method as claimed in claim 5, wherein said sound waves are emitted for a specified length of time at periodic intervals.

8. The method as claimed in claim 4, wherein said sound waves are emitted for a specified length of time at periodic intervals.

9. The method an claimed in claim 4, wherein said sound waves are introduced into said gas turbine at least at an inlet end of said compressor part.

10. The method as claimed in claim 3, wherein said sound waves are emitted for a specified length of time at periodic intervals.

11. The method an claimed in claim 3, wherein said sound waves are introduced at least at an inlet end of said compressor part.

12. The method as claimed in claim 1, wherein said sound waves are emitted for a specified length of time at periodic intervals.

13. The method as claimed in claim 12, wherein said periodic intervals are between 10–15 minutes, and said specified lengths of time are between 15 to 30 seconds.

14. The method as claimed in claim 13, wherein said sound waves are introduced into said gas turbine at least at an inlet end of said compressor part.

15. The method as claimed in claim 1, wherein said at least one separate and independently controlled sound generator comprises plural local sound transmitters, comprising:
    arranging said plural local sound transmitters at various positions at and attached to said gas turbine.

16. The method an claimed in claim 15, wherein sound waves are generated with a fixed or variable frequency of less than 500 Hz.

17. The method as claimed in claim 15, comprising:
    using acoustic horns operated by compressed air as said sound transmitters.

18. The method as claimed in claim 15, wherein said sound waves are emitted for a specified length of time at periodic intervals.

19. The method as claimed in claim 18, wherein said periodic intervals are between 5 and 60 minutes, and said specified lengths of time are between 5 and 60 seconds.

20. The method as claimed in claim 19, wherein said periodic intervals are between 10–15 minutes, and said specified lengths of time are between 15 to 30 seconds.

21. The method as claimed in claim 15, wherein said sound waves are introduced into said gas turbine at least at an inlet end of said compressor part.

22. A gas turbine apparatus comprising:
    a gas turbine;
    at least one separate sound transmitter arranged on an external portion of said gas turbine and controlled independently of generation of sound in said gas turbine to emit sound waves into said gas turbine thereby to implement cleaning of deposits on inner surfaces of said gas turbine; and
    a controller which controls said at least one transmitter to generate and emit sound waves into said gas turbine at predetermined times during operation of said gas turbine to implement cleaning of said deposits.

23. The gas turbine apparatus as claimed in claim 22, wherein said gas turbine comprises:
    a turbine part with an entry-end turbine inlet,
    an upstream compressor part with an entry-end air inlet, and
    a combustion chamber arranged between said compressor part and said turbine part; and
    wherein said at least one sound transmitter is arranged on said air inlet of said compressor part.

24. The gas turbine apparatus as claimed in claim 23, wherein said compressor part and said turbine part each comprise a plurality of stages, and wherein a plurality of sound transmitters are respectively arranged, and distributed around a turbine center line, in at least one stage of said compressor part and at least one stage of said turbine part of said gas turbine.

25. The gas turbine apparatus as claimed in claim 24, comprising:
    said gas turbine comprising a turbine part with an entry-end turbine inlet and an upstream compressor part with an entry-end air inlet; and
    plural of said sound transmitters at least attached both at said air inlet of said compressor part and at said turbine inlet of said turbine part.

26. The gas turbine apparatus as claimed in claim 25, wherein said compressor part and said turbine part each comprise a plurality of stages, and said sound transmitters are additionally attached to said stages of said compressor part and to said stages of said turbine part.

27. The gas turbine apparatus as claimed in claim 22, wherein said at least one sound transmitter is configured as an acoustic horn operated by compressed air and is connected to a compressed air source via compressed air conduits provided with controllable valves.

28. The gas turbine apparatus an claimed in claim 27, wherein said gas turbine comprises a compressor part, and said compressor part of said gas turbine itself is used as said compressed air source.

29. A gas turbine apparatus comprising:
    a gas turbine;
    at least one separate sound transmitter arranged on an external portion of said gas turbine and controlled independently of generation of sound in said gas turbine to emit sound waves into said gas turbine thereby to implement cleaning of deposits on inner surfaces of said gas turbine; and
    a controller which controls said at least one transmitter to generate and emit sound waves into said gas turbine at predetermined times during operation of said gas turbine to implement cleaning of said deposits;
    wherein said at least one sound generator is configured as an acoustic horn operated by compressed air and is connected to a compressed air source via compressed air conduits provided with controllable values;
    wherein said controller comprises;
        a timer for initiating generation of sound at said predetermined times; and
        a valve control system which actuates said controllable valves in response to an output of said timer.

* * * * *